(12) United States Patent
García et al.

(10) Patent No.: US 7,678,396 B2
(45) Date of Patent: Mar. 16, 2010

(54) METHOD OF OBTAINING AVOCADO POWDER

(75) Inventors: Ernesto Díaz García, Morelia Michoacan (MX); José Antonio Zamudio Hernández, Morelia Michoacan (MX); Rafael Dueñas Vargas, Morelia Michoacan (MX); Sandra Castillo Cervantes, Morelia Michoacan (MX)

(73) Assignee: SI O SI Alimentos, S.A. De C.V. (MX)

( * ) Notice: Subject to any disclaimer, the term of this patent is extended or adjusted under 35 U.S.C. 154(b) by 0 days.

(21) Appl. No.: 11/816,812

(22) PCT Filed: Feb. 21, 2006

(86) PCT No.: PCT/MX2006/000012

§ 371 (c)(1), (2), (4) Date: Mar. 20, 2008

(87) PCT Pub. No.: WO2006/088344

PCT Pub. Date: Aug. 24, 2006

(65) Prior Publication Data

US 2008/0286385 A1    Nov. 20, 2008

(30) Foreign Application Priority Data

Feb. 21, 2005  (MX) .................. GT/A/2005/000002

(51) Int. Cl.
*A61K 36/00* (2006.01)
(52) U.S. Cl. ........................... 424/777; 424/725
(58) Field of Classification Search ........... None
See application file for complete search history.

(56) References Cited

U.S. PATENT DOCUMENTS

| | | | | |
|---|---|---|---|---|
| 3,445,247 | A | * | 5/1969 | Baerwald .................... 426/640 |
| 4,008,336 | A | * | 2/1977 | Haendler et al. ........... 426/270 |
| 4,126,142 | A | * | 11/1978 | Saute ...................... 424/78.03 |
| 4,629,629 | A |  | 12/1986 | David |
| 5,384,147 | A |  | 1/1995 | Hilpert |
| 5,871,794 | A |  | 2/1999 | Brito |
| 6,358,555 | B1 |  | 3/2002 | Takahashi |
| 6,440,464 | B1 | * | 8/2002 | Hsia et al. .................... 424/725 |
| 2002/0037333 | A1 | * | 3/2002 | Arimoto et al. ............. 424/769 |

FOREIGN PATENT DOCUMENTS

GB    948517 A    2/1964

OTHER PUBLICATIONS

PROMT Newsletter entitled "Awesome avocado. (Ingredient Showcase)." Mar. 2003. Snack Food & Wholesale Backery. Vo. 92, No. 3, p. 40(1). 1 page PROMT abstract enclosed.*

* cited by examiner

*Primary Examiner*—Christopher R. Tate
(74) *Attorney, Agent, or Firm*—Miller, Matthias & Hull

(57) ABSTRACT

The invention relates to avocado powder and to the method of obtaining the same. Avocado powder is a novel product which enables the avocado to be preserved for an extended period of time at ambient temperature, such as to conserve the characteristic properties of the product, with the additional advantage of being 100% natural and occupying less physical storage space, thereby eliminating the post-processing cold chain. The method of obtaining avocado powder comprises a series of operations or steps that terminate in the pulverization and packing of the end product.

6 Claims, No Drawings

METHOD OF OBTAINING AVOCADO POWDER

CROSS-REFERENCE TO RELATED PATENT APPLICATIONS

This patent application is the National Stage of International Application No. PCT/MX2006/000012 filed Feb. 21, 2006, that claims the benefit of Mexican Application No. GT/a/2005/000002 filed Feb. 21, 2005.

TECHNICAL FIELD

The present process and product are related to the production and preservation of food, more specifically to preservation of avocado.

BACKGROUND OF THE INVENTION

Currently, preservation methods for avocado can be summarized in a) refrigeration of unprocessed avocado, which involves that the fruit has to be cut before its ripening, the cut fruit must be transported in a cold environment to inhibit avocado ripening and the storage space needed for transportation is large; on the other hand, once the avocado reaches its full maturation, said maturation is not uniform, thereby affecting flavor, b) processing and freezing of avocado employing preservatives, which alters some of the organoleptic properties, such as flavor, color and texture, also affecting, on the other hand, the nutritional properties of the fruit, and some of the employed preservatives are toxic. As is mentioned in "Moreno M. F., De la Torre B. M$^a$. "Lecciones de Bromatología". Universidad de Barcelona. Facul tad de Farmacia. 1983" some of the documents related to the prior art referring to processing and freezing of avocado are mentioned next: Method of preserving avocado pulp, U.S. Pat. No. 5,384,147; stabilized guacamole and method thereof, U.S. Pat. No. 5,871,794; process for producing frozen avocados, U.S. Pat. No. 6,358,555; method of processing avocados, U.S. Pat. No. 4,629,629. c) drying of avocado; stabilized meal from avocado pulp, process and products, Mexican patent MX230112; method of stabilizing pulp from fruits and vegetables, particularly avocado pulp, patent EP1474000.

The advantages of the method described herein in relation to the cited patent documents is that we use just avocado regardless of the variety, no other additive of any kind is added such as to recover or enhance the characteristics of avocado at the end of its treatment or processing.

By virtue of the process of obtaining which is described in this invention, the oxidation of fats and essential oils from avocado is prevented as well as loss of characteristic compounds that confer to avocado its smell, color and flavor. Another advantage of this novel process is the speed and healthiness with which said process is performed, which guarantees a quality final product having a prolonged shelf life.

OBJECT OF THE INVENTION

It is an object of the invention to obtain avocado powder by means of a process that increases the shelf life, preventing fat oxidation and break down of characteristics compounds that confer to avocado its smell, color and flavor, without affecting those of the properties of avocado, both nutritional and organoleptic, without adding any additive or preservative, thereby obtaining a natural product.

DETAILED DESCRIPTION OF THE INVENTION

The characteristic details from this novel product and process are clearly shown in the following description and the accompanying tables.

The physical state of avocado powder is a porous solid and its organoleptic characteristics are a green color identical to that of avocado in its natural state. The characteristic odor of avocado is preserved in avocado powder due to the fact that the chemical compounds that confer odor are not altered, on the other hand, avocado flavor, once re-hydrated is identical to the natural flavor.

In powdered avocado, the nutrient content is very similar to that of natural avocado, it can be seen that proteins, fats, carbohydrates, and fibers have a percentage similar to that of avocado in its natural state. Since the treatment, which is described below, prevents that nutrients contained in avocado from being lost, this was confirmed using scientific methods. The technique that was used for protein determination was the Kjeldahl method, to determine the fat content in avocado the Soxhlet Extraction Method was used, moisture was determined using the gravimetric technique of constant weight, the amount of fiber present was determined by the crude fiber method.

The powdered avocado is obtained by a process consisting of the following steps:

I. Avocado Selection, in this step the fruits are separated depending on the industrial application pretended for avocado powder, if it is pretended for the cosmetic industry, the fruit should have a high content of fat, which is determined by performing bromatological analysis to the different avocado varieties, in addition to discarding any fruit which is damaged. The selected fruit for processing should be a ripe fruit, free of diseases and/or pests typical of avocado, because if the avocado is not ripe the flavor of the paste changes.

II. Removal of pit and hull from avocado flesh, which can be done manually, or by means of automatic equipment depending on the scale in which the work is carried out. This process step is performed in order to conditioning or preparing the fruit for the next process step.

III. Milling of the avocado pulp, which can be manually or automatically depending on the scale in which the work is carried out. In this step, as a result, a paste having a density of 904 g/cm$^3$ is obtained, with a green color that is identical to the color of natural avocado. This step is performed in order to conditioning the avocado pulp and to increase both the mass transfer area, and the heat transfer area, and in this way to obtain more efficient results, and in a lower cost en steps V and VI of the process.

IV. Application of avocado paste to the dehydrator vessels. The paste obtained in step III is placed in the dehydrator vessels, taking care that the paste does not exceed a 2 centimeters thickness. This is to ensure that dehydration will be uniform throughout the paste. The time used to perform steps III and IV should be short, e.g. less than 30 min, because if the exposition time of the avocado paste to environment increases, the paste begins to oxidize due to contact with oxygen and light. The time used in steps III and IV could be increased to more than 2 hours if additives such as antioxidants such as: ascorbic acid, sodium ascorbate (0.01), citric acid (0.01 to 1.5%) are added, but our goal is to obtain a natural product; another way to reduce oxidation of the paste is performing step III in cold conditions at temperatures from 1° C. to 5° C.

V. Cooling prior to dehydration, in this step a refrigeration chamber is used which must meet the requirements of temperature needed such that a proper previous cooling can be carried out. Said cooling can be effected in two ways: by means of fast cooling, with liquid nitrogen, or a freezing mixture consisting of dry ice and ethanol, for 2 to 5 minutes; or otherwise, by means of a slow cooling in a refrigeration chamber (1° C. to 5° for a minimum of 1 hr): during fast cooling small ice crystals are formed within the avocado pulp matrix whereas during slow cooling large ice crystals are formed in the avocado pulp matrix. In our experiment, we use both cooling methods and we achieved excellent results. The pre-cooling should have a minimum duration that ensures water solidification, that is crystal formation from water contained in the avocado paste at a temperature that prevents the formation of eutectics which are detrimental to the process, during this period of time, the vessels should be rotated continuously in order to ensure a uniform cooling. In this step the enzymatic activity is inhibited by virtue of the low temperatures that are used, preventing, therefore, the oxidation of the avocado paste.

VI. Avocado Paste Dehydration. This step relies on the principle of sublimation, that is, having the water passing from solid state to vapor state without passing through the liquid phase, this is achieved working with low pressures and low temperatures. This kind of dehydration is carried out in a freeze dryer that works under the principle of sublimation. The vessels containing the avocado paste are placed in the dryer. During dehydration the parameters to be controlled are; a vacuum pressure lower than atmospheric from between $450 \times 10^{-3}$ to $50 \times 10^{-3}$ in the freeze dryer vacuum chamber, a freeze dryer condenser temperature of $-40°$ C. as minimum. An additional parameter to be controlled is heat applied to the avocado paste-containing vessels which should be kept at a temperature close to ambient temperature, because if said temperature is lower than 20° C., more time will be needed to sublimate all of the ice present in the avocado paste, if the temperature applied to the vessels containing the avocado paste is greater than 35° C., the avocado's nutritional and organoleptic properties are affected by the applied heat, greater then 35° C. The dwelling time of the avocado paste in the freeze dryer was from 1 hr to 10 hrs. Said time depends on the parameters which are employed. All parameters mentioned in this step should be strictly controlled to achieve a successful dehydration.

Finally a porous solid having a color identical to that of avocado is obtained, with a moisture content lower than 1%, having odor and flavor typical of avocado, and retaining the nutrients contained in avocado. The freeze drying method is used for food stuffs that are degradable or that experiences changes in their structure, texture, appearance or flavor as consequence from the high temperatures employed in the conventional drying methods, therefore, the present method was used to dehydrate avocado. In the experiments, the drying time was in different time intervals. All the obtained samples were analyzed for its nutrimental components, confirming that regardless of time the nutrients are conserved in avocado powder. Said stability can be seen in the following tables (1, 2, 3, 4, 5). All the results from tables (1, 2, 3, 4, 5) are on a dry basis, these tables come from experimentation on drying which was performed in triplicate as well as the bromatological analysis.

TABLE 1

| Dehydration time (hr) | % Moisture |
|---|---|
| 1 | 1.17 (±0.04) |
| 2 | 0.5417 (±0.04) |
| 3 | 0.3241 (±0.04) |
| 4 | 0.2295 (±0.04) |
| 5 | 0.2559 (±0.04) |
| 6 | 0.2085 (±0.04) |
| 7 | 0.2027 (±0.04) |
| 8 | 0.0244 (±0.04) |
| 9 | 0.2283 (±0.04) |
| 10 | 0.2751 (±0.04) |

TABLE 2

| Dehydration time (hr) | % Protein |
|---|---|
| 2 | 6.15565 (±0.5) |
| 3 | 7.69246 (±0.5) |
| 4 | 4.84195 (±0.5) |
| 5 | 5.99077 (±0.5) |
| 6 | 6.48856 (±0.5) |
| 7 | 4.52632 (±0.5) |
| 8 | 7.66135 (±0.5) |
| 9 | 7.61419 (±0.5) |
| 10 | 6.47174 (±0.5) |

TABLE 3

| Dehydration time (hr) | % Fat |
|---|---|
| 2 | 66.22167 (±0.5) |
| 3 | 64.43250 (±0.5) |
| 4 | 63.94083 (±0.5) |
| 5 | 61.43125 (±0.5) |
| 6 | 61.225 (±0.5) |
| 7 | 60.773625 (±0.5) |
| 8 | 61.05 (±0.5) |
| 9 | 59.72 (±0.5) |
| 10 | 61.17 (±0.5) |

TABLE 4

| Dehydration time (hr) | % Fiber |
|---|---|
| 2 | 19.22666 (±0.5) |
| 3 | 18.62047 (±0.5) |
| 4 | 21.16497 (±0.5) |
| 5 | 12.18313 (±0.5) |
| 6 | 16.36019 (±0.5) |
| 7 | 16.25424 (±0.5) |
| 8 | 17.33839 (±0.5) |
| 9 | 15.10221 (±0.5) |
| 10 | 16.63721 (±0.5) |

TABLE 5

| Dehydration time (hr) | % Carbohydrates |
|---|---|
| 2 | 7.85432 (±0.5) |
| 3 | 8.93047 (±0.5) |
| 4 | 10.2452 (±0.5) |
| 5 | 20.13202 (±0.5) |
| 6 | 15.71781 (±0.5) |
| 7 | 18.28049 (±0.5) |
| 8 | 13.92786 (±0.5) |
| 9 | 17.3353 (±0.5) |
| 10 | 15.44595 (±0.5) |

VII. Finally, the dehydrated avocado is removed from the containers, pulverized and packaged. This packing should be in oxygen and light-impervious containers to avoid discoloration and rancidity of fats from avocado. The packing should be carried out in a controlled atmosphere and not under vacuum.

Once the above described method concludes, an amount of powdered avocado from between 30% to 35% relative to the mass of avocado applied is obtained; said percentage will depend on the type of avocado which is used and on the duration of dehydration.

Powdered avocado allows for a reduction in transportation cost, and in storage space costs since that a lesser amount of space and power is required to store the avocado powder due to it does not contain water anymore and it does not need refrigeration, and the residence time or shelf life of powdered avocado is extended, at least 1 year, the latter due to the fact that the percentage of water in powdered avocado is less than 1%, thereby preventing the proliferation of microorganisms (due to the low water activity).

The avocado powder can be used in the food industry for human consumption, as raw material for the making of other food products, such as creams, shakes, ice cream base, mousse, buttermilks, jams, milk shakes, guacamoles, in the form of deep, sauces. Also as a raw material in textile industry from the pigment, that is, the natural colorant obtained from powdered avocado, in the cosmetics industry as raw material using the oil contained in the avocado powder for the making of creams, exfoliating creams, shampoo, baby oil, perfumes, and in pharmaceutical industry in the extraction of active ingredients since it does not contain any additive that modifies its characteristics. To the product obtained by the present process, certain type of additive can be added, that is, it can be fortified, with vitamins, minerals, proteins, antioxidants, preservers, thickeners, colorants or any other chemical that is added to the final product. Meaning that this powdered avocado is a natural product, however, the powdered avocado is ready to be added with nutritive substances based on the requirements of the companies from the food industry, which requires so.

EXAMPLE

During the process of production of powdered avocado, the step of dehydration using the freeze dryer is a crucial step, the optimal dehydration times varying from 4 hrs to 6 hrs, for several reasons: first, after 6 hrs of dehydration the product becomes highly hygroscopic causing that more energy than necessary should be expended and that after the drying process this removed moisture would be recovered by the product, if left from 1 to 3 hrs, more heat will need to be applied, that is, greater than 35° C. which will cause damage to the nutrients and characteristic compounds from avocado.

What is claimed is:

1. A process of obtaining avocado powder, comprising the following steps:
    selecting ripe avocados, in which the avocados include flesh, pits, and hulls;
    removing the pits and hulls from the flesh;
    milling the flesh to form an avocado paste;
    placing a layer of avocado paste into at least one dehydrator vessel, the layer of avocado paste having a thickness that does not exceed 2 centimeters;
    cooling the avocado paste;
    dehydrating the avocado paste in a freeze vacuum chamber for a predetermined time of approximately 1 to 10 hours;
    pulverizing the dehydrated avocado paste; and
    packing the pulverized avocado paste.

2. The process of claim 1, wherein the cooling of the avocado paste is carried out with liquid nitrogen or a freezing mixture consisting of dry ice and ethanol for approximately 2 to 5 minutes.

3. The process of claim 1, wherein the cooling of the avocado paste is carried out in a refrigeration chamber at approximately 1 to 5° C. for a predetermined time of at least 1 hour.

4. The process of claim 3, wherein the at least one dehydrator vessel is rotated continuously to ensure uniform cooling.

5. The process of claim 1, wherein dehydrating the avocado paste is carried out at a pressure of approximately $450 \times 10^{-3}$ to $50 \times 10^{-3}$ mbar and a temperature of approximately $-40°$ C., during a predetermined period of time of approximately 1 to 10 hours.

6. The process of claim 1, wherein packing the pulverized avocado paste is performed in oxygen and light-impervious containers and in a controlled atmosphere.

* * * * *